Aug. 4, 1953  H. WEINBERGER  2,647,278
SHRIMP DEVEINER AND SHELLER
Filed July 12, 1950
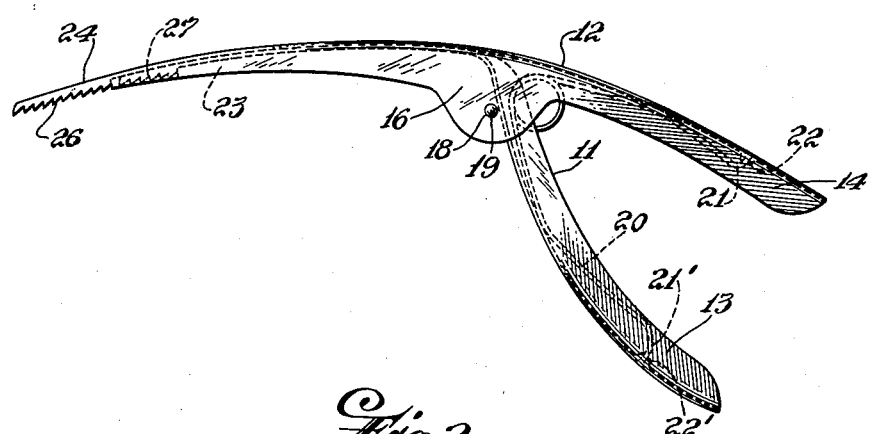
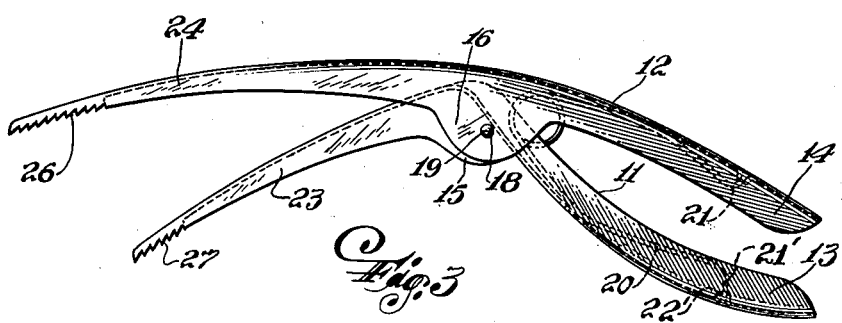
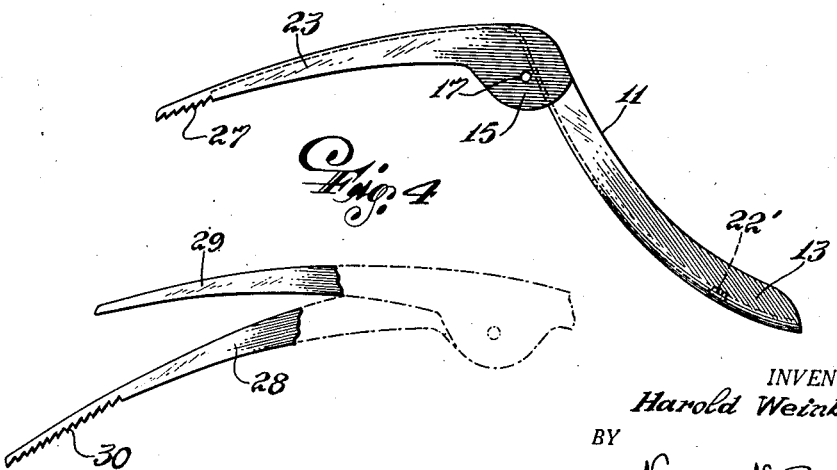
INVENTOR.
Harold Weinberger
BY
Norman N. Popper
ATTORNEY Patented Aug. 4, 1953

2,647,278

UNITED STATES PATENT OFFICE 2,647,278

SHRIMP DEVEINER AND SHELLER

Harold Weinberger, South Orange, N. J.

Application July 12, 1950, Serial No. 173,349

3 Claims. (Cl. 17—7)

My invention relates generally to shrimp deveiners and shellers, and specifically to hand operated devices of this class that combine both functions in a single continuous operation.

It is among the objects of my invention to provide a device which removes the vein from a shrimp in an expeditious manner.

It is among the further objects of my invention to provide a device which removes or facilitates the removal of the shell of a shrimp.

It is yet a further object of my invention to provide a device which combines, in a single continuous operation, the deveining and shelling of a shrimp.

Among the further objects and advantages of my invention is the fact that my device is simple in form, efficient in operation, easy to manufacture, relatively inexpensive, durable and may be operated by an unskilled person.

These objects and advantages, as well as other objects and advantages, may be achieved by the device illustrated in the drawings, in which:

Figure 1 is a side view of my shrimp de-veiner and sheller;

Figure 2 is a side view thereof with the jaws distended;

Figure 3 is a side view of the inner jaw thereof detached from the outer jaw; and Figure 4 is a partial side view of a modified form of my shrimp de-veiner and sheller.

Referring now to the drawings in detail, my shrimp deveiner and sheller has a lower arm 11 and an upper arm 12. These arms may be formed of sheet metal, suitably curved and bent in a somewhat tubular form, or they may be formed of solid metal, plastic, or some other material. The lower arm 11 has a handle 13 or gripping area at one end where it is intended to be grasped and held. The upper arm 12 has a corresponding cooperative handle 14 or gripping area at one end where it likewise is intended to be grasped and held. The lower arm 11 has a central extended portion 15. The upper arm 12 likewise has a central extended portion 16. The overall dimensions of the lower arm 11 are less than the interior dimensions of the upper arm 12 so that the lower arm 11 may fit within the upper arm 12. This will bring into coincidence the extended portions 15, 16. There is a hole 17 in the extended portion 15 of the lower arm 11 and another hole 18 in the extended portion 16 of the upper arm 12. These holes are in register with each other and a pivot pin 19 is passed through them so that the arms 11, 12 are pivotally engaged with each other. The handles 13, 14 are maintained at the limits of their outward pivoting by a spring 20. The ends 21, 21' of the spring enter sockets 22, 22' formed in handles 13, 14 by which means the spring 20 is held in place and normally urges the handles apart.

The other end 23 of the arm 11 is shorter than the other end 24 of the arm 12. By reason of the action of the spring 20, the end 23 will lie within, or in close relationship with the end 24. The ends 23, 24 are not straight, but are curved in a manner to conform, in an approximate way, with the back curvature of an average size shrimp. On the bottom or inner side of the end 24, there are a number of teeth 26. Likewise, on the bottom of the end 23, there are also a number of teeth 27.

A somewhat variant form of the device is shown in Figure 4 in which the lower end 28 is longer than the upper end 29. In this form, the end 29 is not provided with teeth but the end 28 is provided with teeth 30.

The operation of my shrimp de-veiner and sheller is sure and simple. The handles 13, 14 are grasped in one hand and the shrimp is held in the other. The ends 23, 24 are inserted into the body of the shrimp under the shell or casing and through the channel in the back of the shrimp. Due to the curvature of the ends 24, 25, they will substantially conform to the curvature of the back of the shrimp. As they pass down the channel in the back of the shrimp, the teeth 26, 27 will gouge or scrape the vein that lies in the bottom of the channel. When the maximum degree of insertion is achieved, the handles 13, 14 are compressed. This pops-off the shell of the shrimp, or explodes it open to such an extent that it may be easily removed. The device is then removed from the channel and the teeth 26, 27 will carry with them the vein which it is desired to remove. In removing the device, in order to ensure the de-veining operation, the device should be moved in an arc-like manner in the same way that it was inserted, so that there will be a reverse gouging or scraping effect, to carry out the debris.

The foregoing description is intended merely to be illustrative of one embodiment of my invention, for many changes may be made in the construction, selection and arrangement of the various parts, within the scope of the appended claims, without departing from the spirit of the invention.

I claim:

1. A shrimp de-veiner and sheller comprising a first arm that is curved longitudinally to provide convex and concave sides, said arm being arcuate in cross section and tapering gradually toward its outer end, a handle portion extending from the other end of said arm, a second arm of substantially the same configuration as the first arm and being of less length than said first arm, a handle portion extending from one end of the second arm and disposed on the same side as said second arm, said arms being pivotally connected together intermediate their ends, the second arm normally nesting within the confines of the first arm, and teeth formed on the concave edges of the first arm beyond the outer end of the second arm.

2. A shrimp de-veiner and sheller of the character defined in claim 1, wherein spring means is arranged between the two handle portions for holding the arms in nested relation with one another.

3. A shrimp de-veiner and sheller of the character defined in claim 1, wherein teeth are formed on the concave edges of the outer end portion of the second arm.

HAROLD WEINBERGER.

References Cited in the file of this patent

UNITED STATES PATENTS

| Number | Name | Date |
|---|---|---|
| D. 161,405 | Achenbach | Jan. 2, 1951 |
| 649,939 | Leighton et al. | May 22, 1900 |
| 653,920 | Parks | July 17, 1900 |
| 1,459,007 | Wetzig | June 19, 1923 |
| 1,767,175 | Glass | June 24, 1930 |
| 2,071,897 | Pazzano | Feb. 23, 1937 |
| 2,154,580 | Perrin et al. | Apr. 18, 1939 |
| 2,297,765 | Hoover, Jr. | Oct. 6, 1942 |
| 2,397,823 | Walter | Apr. 2, 1946 |
| 2,435,075 | Gould | Jan. 27, 1948 |
| 2,552,450 | Paoli | May 8, 1951 |
| 2,561,283 | Leslie | July 17, 1951 |